United States Patent [19]

Lust et al.

[11] Patent Number: 5,545,366
[45] Date of Patent: Aug. 13, 1996

[54] MOLDING ARRANGEMENT TO ACHIEVE SHORT MOLD CYCLE TIME AND METHOD OF MOLDING

[76] Inventors: Victor Lust, 2808 Scott Mill Estates Dr., Jacksonville, Fla. 32257; W. Anthony Martin, 2603 Sandlewood Ct., Orange Park, Fla. 32065; Kornelis Renkema, 12412 Autumnbrook Trail West, Jacksonville, Fla. 32258; Wybren Van Der Meulen, Breembosg, Nuenen, Netherlands

[21] Appl. No.: 257,794

[22] Filed: Jun. 10, 1994

[51] Int. Cl.$^6$ .......................... B29C 33/38; B29C 45/20; B29C 45/73
[52] U.S. Cl. ..................... 264/225; 264/2.5; 264/328.12; 264/328.16; 425/552; 425/556; 425/588; 425/808; 425/812
[58] Field of Search ................................... 425/808, 548, 425/552, 556, 588, 812; 249/117, 134; 264/2.5, 225, 328.12, 328.16

[56] References Cited

U.S. PATENT DOCUMENTS

| | | | |
|---|---|---|---|
| 2,828,509 | 4/1958 | Smucker et al. | 425/552 |
| 4,091,057 | 5/1978 | Weber | 264/328.7 |
| 4,495,313 | 1/1985 | Larsen | 523/106 |
| 4,565,348 | 1/1986 | Larsen | 249/134 |
| 4,640,489 | 2/1987 | Larsen | 425/808 |
| 4,680,336 | 7/1987 | Larsen et al. | 264/2.6 |
| 4,691,820 | 9/1987 | Martinez | 206/205 |
| 4,889,664 | 12/1989 | Kindt-Larsen et al. | 264/2.6 |
| 4,966,544 | 10/1990 | Mitake | 264/328.16 |
| 4,983,346 | 1/1991 | Curliss et al. | 425/556 |
| 5,039,459 | 8/1991 | Kindt-Larsen et al. | 264/2.6 |
| 5,080,839 | 1/1992 | Kindt-Larsen | 264/2.3 |
| 5,094,609 | 3/1992 | Kindt-Larsen | 264/2.6 |
| 5,352,398 | 10/1994 | Crowe | 425/556 |

FOREIGN PATENT DOCUMENTS

| | | | |
|---|---|---|---|
| 60-217114 | 10/1985 | Japan | 425/808 |
| 61-35221 | 2/1986 | Japan | 425/808 |
| 2-70407 | 3/1990 | Japan | 425/808 |

*Primary Examiner*—Robert Davis

[57] ABSTRACT

An arrangement for molding a front or back polystyrene mold half which is used, with a second complementary back or front mold half, for subsequent molding of a soft contact lens such as a hydrogel soft contact lens. Each mold half defines a convex curved surface and a concave curved surface spaced therefrom, with one of the surfaces defining an optical quality curved surface for the soft contact lens. A heated molding machine introduces molten polystyrene through a hot runner system to a plurality of mold cavities, each of which defines an optical quality curved surface and also a second noncritical surface. The optical quality surface of the mold cavity is positioned further away from the heated hot runner side of the mold than the second surface, which allows faster cooling of the optical quality surface of the mold cavity. Each mold cavity has a first insert on the optical quality side of the mold cavity and a second insert on the second side. Each of the first and second inserts has a circumferential cooling passageway defined therearound or in proximity for the first inserts, and also includes a bubbler positioned internally therein. Coolant is circulated in a turbulent mode through the circumferential passageways and also through the bubblers against inner surfaces of the insert to provide rapid cooling of the mold cavity.

46 Claims, 4 Drawing Sheets

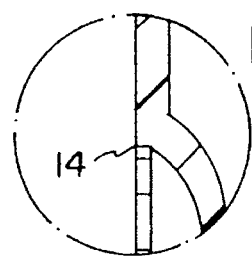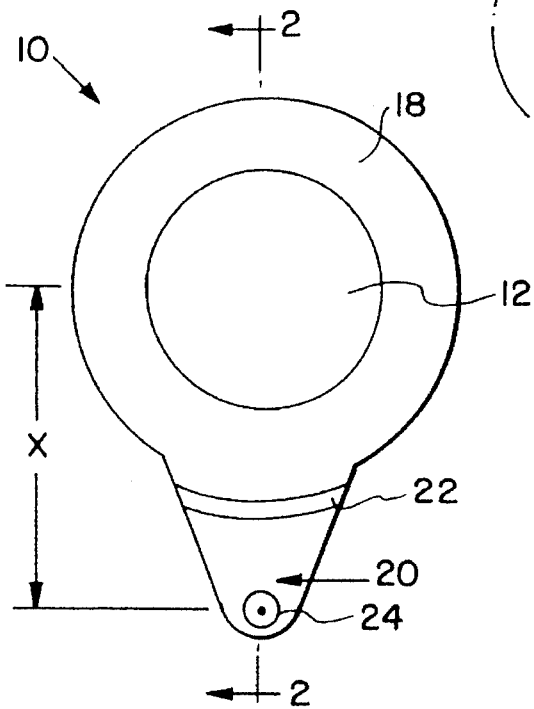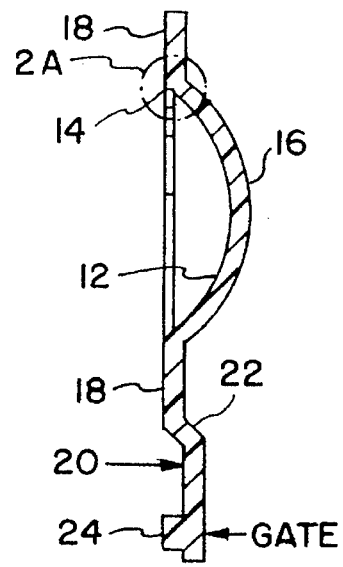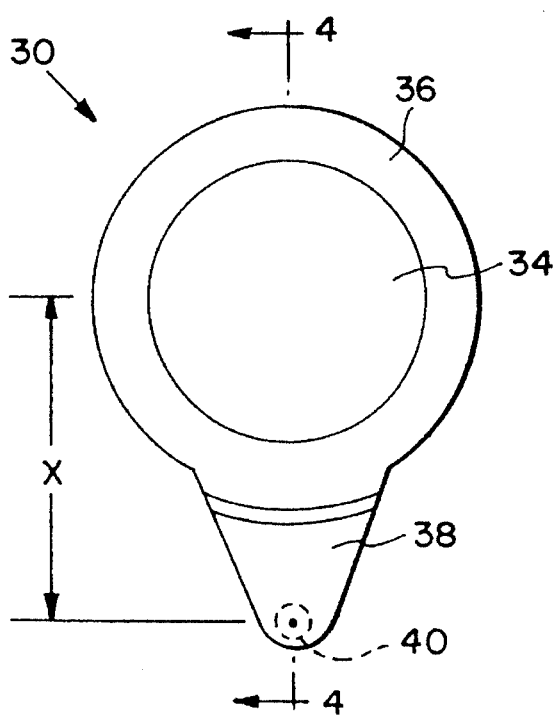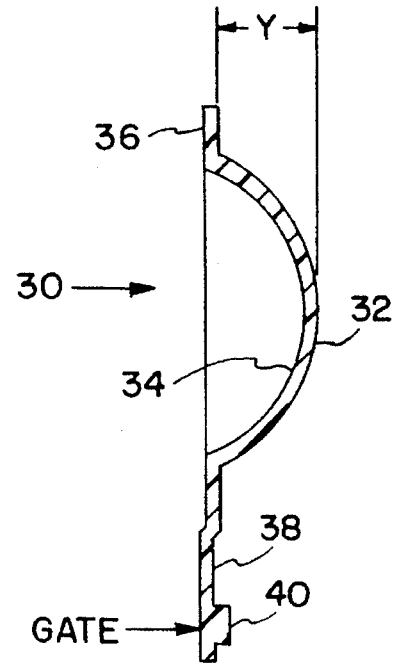

MOLDING ARRANGEMENT TO ACHIEVE SHORT MOLD CYCLE TIME AND METHOD OF MOLDING

BACKGROUND OF THE INVENTION

1. Field of the Invention

The present invention relates generally to an arrangement and method for molding a front or back mold half which is used, with a second complementary back or front mold half, for subsequent molding of a soft contact lens such as a hydrogel soft contact lens.

More particularly, the subject invention pertains to an arrangement and method as described for molding a front or back polystyrene mold half in a manner which is designed with heat flow considerations in mind to minimize the molding cycle time, which has been reduced to approximately three to six seconds, depending upon the wall thickness, while producing uniformly acceptable, optical quality mold halves.

2. Discussion of the Prior Art

U.S. Pat. No. 4,565,348 to Larsen discloses a typical prior art approach to manufacturing mold halves similar to the present invention. Pursuant to this prior art approach, the mold halves are molded as a set of eight mold halves carried on a frame in a 2×4 array. FIG. 3 of the Larsen patent illustrates a molded frame carrying a 2×4 array of concave front or female mold halves, while FIG. 5 therein shows a molded frame carrying a 2×4 array of convex back or male mold halves. The cluster assembly of the frame and molds is manufactured by injection molding the assembly as one piece with the molds being secured within an outer rectangular frame by small struts extending between the frame and the molds. The height of the frame is such that the surfaces of the molds are protected from scratching and mechanical damage during handling, and the frame in general has a shape facilitating stacking and handling. This prior art approach of molding such polystyrene mold halves in a cluster assembly typically takes approximately twenty-four (24) seconds, which is considered to be too long for the efficient production of such polystyrene mold halves. In contrast thereto, pursuant to the present invention, the molding of such polystyrene mold halves takes approximately three to six seconds, depending upon the wall thickness.

A complementary pair of front and back mold halves is used in the production of hydrogel contact lenses by direct molding of a monomer mixture wherein the mixture is dissolved in a non-aqueous, water-displaceable solvent. The mixture is initially placed in a two part mold consisting of the front and back mold halves which define the shape of the final desired hydrogel (i.e. water-swollen) lens. After a dosing step in which the front concave mold halves are substantially filled with the polymerization mixture, the concave front mold halves are covered with the back mold halves in a manner in which no air bubbles are trapped beneath the back mold halves, which are brought to rest on the concave front mold halves properly aligned and without distortion. This is preferably performed with back mold halves which are put on as individual units on the pools of polymerizable mixture held in the front concave mold halves. Accordingly, prior to the mold covering step, the plurality of back mold halves are separated from the frame by breaking or cutting. The back mold members are preferably held by a mechanical device while they are separated from the frame and which thereafter is used to guide them down and place them all simultaneously on each of the concave front mold halves containing the polymerizable mixture. The monomer/solvent mixture is then subjected to conditions whereby the monomer(s) polymerize, such as irradiation with actinic visible or ultraviolet radiation, to thereby produce a polymer/ solvent mixture in the shape of the reduced final size of the desired hydrogel lens.

After the polymerization process is completed, the two halves of the mold are separated (called demolding), typically leaving the contact lens in the front mold half, from which it is subsequently displaced. The front and back mold halves are used for only a single molding, after which they are disposed of. After the polymerization is complete, the solvent is displaced with water to produce a hydrated lens the final size and shape of which are quite similar to the size and shape of the original molded polymer/solvent article. The direct molding of hydrogel contact lenses is disclosed in U.S. Pat. No. 4,495,313 to Larsen, U.S. Pat. No. 4,680,336 to Larsen et al., U.S. Pat. No. 4,565,348 to Larsen, and U.S. Pat. No. 4,640,489 to Larsen et al., the entire disclosures of which are hereby incorporated by reference in this patent application.

SUMMARY OF THE INVENTION

Accordingly, it is a primary object of the present invention to provide a molding arrangement with a mold insert design, heat removal process, and processing to achieve a short mold cycle time.

The molding of the mold halves involves the separate molding of each front mold half and of each back mold half. The inner concave surface of the front mold half defines the outer surface of the contact lens, while the outer convex surface of the back mold half defines the inner surface of the contact lens which rests upon the eye. Accordingly, the shape of the inner concave surface of the female mold half and the shape of the outer convex surface of the male mold half must have acceptable optical quality surfaces. However, the outer convex surface of the front mold half and the inner concave surface of the back mold half need not have the same high optical quality surfaces, and in fact the side of each mold half having one of those surfaces is used by robotic handling equipment to handle the mold halves. The present invention takes advantage of this latter feature to provide molding and very rapid cooling of the critical optical quality surfaces of the contact lens molds, i.e., the inner concave surface of the front mold half and the outer convex surface of the back mold half.

A further object of the subject invention is the provision of a molding arrangement designed to simultaneously mold a plurality of mold halves in a plurality of separate mold cavities, each of which is positioned to space the optical quality surface of the mold cavity further from the heat source of a heated hot runner system of an extruding machine than the second (non-optical quality) surface of the mold cavity. This arrangement allows the optical quality surface of the mold cavity to be cooled as rapidly as possible, to allow quicker setting and locking of temperature residual stresses on the optical quality side of the mold half, thereby resulting in a faster molding and cycle time. This results in the slightly cooler optical quality side of the mold half having slightly less dimensional variation than the second (non-optical quality) surface of the mold half. Moreover, each individual mold surface (optical and non-optical) is cooled separately by coolant circulated around the mold cavity.

The present invention takes a different approach from the prior art as exemplified by Larsen U.S. Pat. No. 4,565,348, and molds individual mold halves in individual mold cavities, each of which produces a nonattached mold half (i.e., not attached to a cluster of similar mold halves). Each individual mold surface is positioned and cooled to achieve a reduced cycle molding time. Moreover, the flow length distance of the polymer has been significantly reduced relative to prior designs, which greatly enhances the ability to optimize the optical attributes of the resultant mold half. There is less probability of freezing the flow passageway as mold temperatures are reduced further to improve cycle time.

Each mold half defines an optical quality surface (i.e., the concave surface in the front mold half and the convex surface in the back mold half). Each mold half also defines a circumferential flange around the convex and concave surfaces. In general, the mold halves are processed and handled by robotic handling systems which handle (as by vacuum grasping) the back side of the flange which is on the opposite side from the optical quality surface of the mold half.

In accordance with the teachings herein, the present invention provides a molding arrangement and method for molding a mold half which is used, with a second complementary mold half, for the subsequent molding of a soft contact lens. Each mold half defines a convex curved surface and a concave curved surface spaced therefrom, with one of the convex and concave surfaces defining an optical quality curved surface for the soft contact lens. A heated mold (to ensure the flow rate does not decrease and shear stresses increase) introduces a molten mold material, such as from a family of thermoplastics, such as polystyrene, polycarbonate, poly[4-methyl-pentene 1] (TPX), polyvinyl chloride (PVC), polyethylene, polypropylene, copolymers of styrene with acrylonitrile or butadiene, acrylates such as polymethyl methacrylate, polyacrylonitrile, polyamides, polyesters, etc. through a hot runner system to at least one (preferably more) mold cavity. Each mold cavity defines an optical quality curved surface and also a second noncritical curved surface for the mold half.

Pursuant to the teachings of the present invention, the optical quality surface of the mold cavity is positioned further away from the heated hot runner side of the mold system than the second surface of the mold cavity, and a cooling system is provided for cooling the mold cavity. The positioning of the optical quality curved surface further away from the heated hot runner system allows faster cooling of the optical quality surface of the mold cavity. This allows quicker setting and locking of temperature residual stresses on the optical quality side of the mold half and a faster molding cycle time. This results in the slightly cooler optical quality side of the mold half having slightly less dimensional variation than the second (non-optical quality) surface of the mold half.

When the mold half is a front or female mold half, the concave surface of the female mold half defines the optical quality surface, and the concave surface of the female mold half is positioned further away from the heated hot runner system than the second surface. When the mold half is a back or male mold half, the convex surface of the male mold half defines the optical quality surface, and the convex surface of the male mold half is positioned further away from the heated hot runner system than the second surface.

In a preferred embodiment, the material being molded into the mold half is polystyrene, but could be any suitable thermoplastic such as mentioned hereinabove in the family of thermoplastics. Moreover, the mold cavity comprises a first insert on the optical quality side of the mold cavity and a second insert on the second side of the mold cavity. Each insert can be manufactured as one integral component, or can be a two-piece design as described hereinbelow. When the mold cavity is for the production of a front mold half, the first insert on the optical quality side of the mold can include a bushing, with a power insert positioned within the bushing. The power insert has a convex end surface which defines the optical quality surface, which also defines the optical power of a contact lens which is subsequently produced by the front mold half, hence the name power insert. Moreover, different optical power (diopter) lenses can be produced by merely changing the power insert to substitute a different power insert having a different curvature convex end surface. Alternatively, the bushing and power insert could also be manufactured as one integral component. The second insert on the second side of the mold cavity does not define as high an optical quality surface, and so can easily be manufactured as one integral component.

Moreover, each of the first and second inserts has a circumferential cooling passageway therearound, either defined in the insert or defined in the steel mold block retaining the insert, through which coolant is circulated in a turbulent mode by the cooling system. Each of the first and second inserts includes a bubbler positioned internally therein, through which coolant is circulated by the cooling system in a turbulent mode against inner surfaces of the insert. In a preferred embodiment, the molding arrangement includes a plurality (such as four or eight) of mold cavities positioned at one end of, and spaced around, the hot runner system.

In a further aspect of the present invention, a molding arrangement and method is provided for molding a mold half, which is used with a second complementary mold half, for the subsequent molding of a soft contact lens. The mold half defines a convex curved surface and a concave curved surface spaced therefrom, with one of the convex and concave surfaces defining an optical quality curved surface for the soft contact lens. In the arrangement and method, a heated molding machine introduces a molten mold material through a hot runner system to at least one mold cavity. Each mold cavity defines an optical quality curved surface and also a second curved surface for the mold half. Pursuant to the teachings of the present invention, the mold cavity comprises a first insert on the optical quality side of the mold cavity and a second insert on the second side of the mold cavity. Each of the first and second inserts has a circumferential cooling passageway therearound or in proximity of the insert, through which coolant is circulated by a cooling system to provide for faster cooling of the mold cavity. This allows quicker setting and locking of minimal temperature residual stresses in the mold half and a faster molding and cycling time. Also, the direct polymer flow path reduces the cooling time (locks in the minimal residual stresses) to reduce the cycle time.

BRIEF DESCRIPTION OF THE DRAWINGS

The foregoing objects and advantages of the present invention for a molding arrangement having a mold insert design to achieve short mold cycle time may be more readily understood by one skilled in the art with reference being had to the following detailed description of several preferred embodiments thereof, taken in conjunction with the accompanying drawings wherein like elements are designated by identical reference numerals throughout the several views, and in which:

FIGS. 1 and 2 are respectively top elevational and side views of one embodiment of a front (female) mold half which is produced pursuant to the present invention;

FIG. 2A is a close up cross-section side view of a front (female) mold half pursuant to the present invention;

FIGS. 3 and 4 are respectively top elevational and side views of one embodiment of a back (male) mold half which is produced pursuant to the present invention;

DETAILED DESCRIPTION OF THE DRAWINGS

Figure 5:
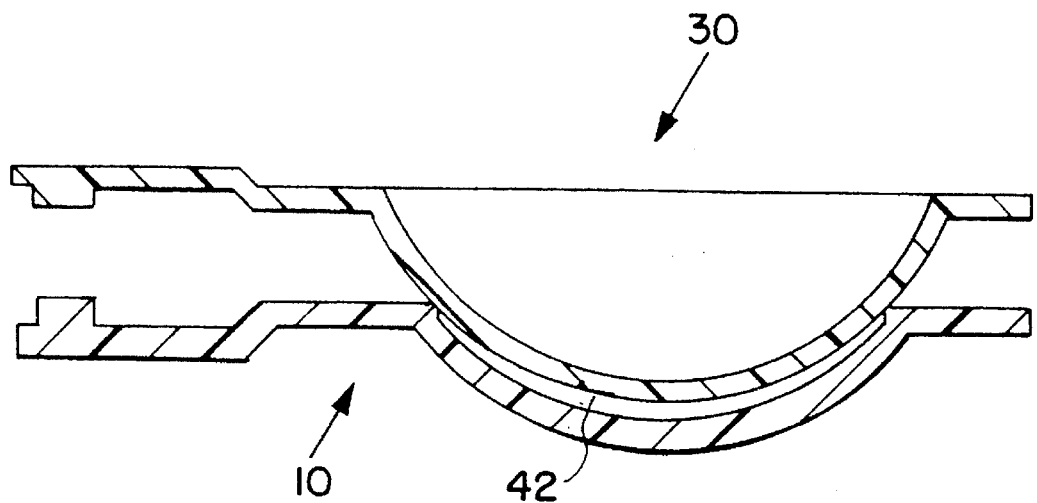
FIG. 5 is a side elevational sectional view of a mold assembly which includes a front mold half and a back mold half.
Figure 8:
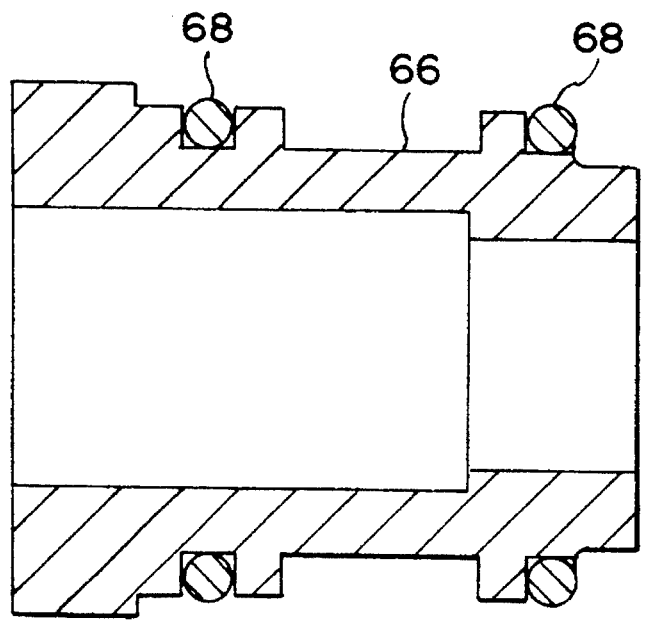
FIG. 8 is a sectional view of a bushing employed in an insert on the optical quality side of the mold cavity of FIG. 6 or 7.

Referring to the drawings in detail, FIGS. 1 and 2 illustrate respectively top elevational and side views of one embodiment of a front mold half 10 useful in the production of a contact lens by the polymerization of a polymerizable composition in a mold assembly composed of two complementary front and back mold halves. The front mold half 10 is preferably formed of polystyrene, but could be any suitable thermoplastic such as mentioned hereinabove in the family of thermoplastics, which is transparent to visible and ultraviolet light to allow irradiation therethrough with light to promote the subsequent polymerization of a soft contact lens. A suitable thermoplastic such as polystyrene also has other desirable qualities such as being moldable to surfaces of optical quality at relatively low temperatures, having excellent flow characteristics and remaining amorphous during molding, not crystallizing, and having minimal shrinkage during cooling.

The front mold half 10 defines a central curved section with an optical quality concave surface 12, which has a circular circumferential well defined edge 14 extending therearound. The edge 14, shown in detail A of FIG. 2, is desirable to form a well defined and uniform plastic radius parting line (edge) for the subsequently molded soft contact lens. The well defined edge 14 actually has a very small curvature which can be in the range of 3–45 um, or less preferably 5–30 um, and the surfaces defining the edge can form an angle in the range of 75°–90°. A generally parallel convex surface 16 is spaced from the concave surface 12, and an annular essentially uniplanar flange 18 is formed extending radially outwardly from the surfaces 12 and 16. The concave surface 12 has the dimensions of the front curve (power curve) of a contact lens to be produced by the front mold half, and is sufficiently smooth such that the surface of a contact lens formed by polymerization of a polymerizable composition in contact with the surface is of an optically acceptable quality. The front mold half is designed with a thickness to transmit heat therethrough rapidly (typically in the range of 0.4 to 1.2 mm, preferably in the range of 0.5 to 1.0 mm, and most preferably in the range of 0.6 to 0.8 mm, and in one embodiment was selected to be 0.8 mm) and rigidity to withstand prying forces applied to separate the mold half from the mold assembly during demolding.

The front mold half or curve thickness was reduced from 1.5 mm in prior designs to 0.8 mm. This had a direct impact on cycle time reduction. Using a one dimensional heat flow, the cooling differential equation is:

$$\frac{\partial T}{\partial t} = a \frac{\partial^2 T}{\partial^2 t} \quad a = \frac{k}{eCp} = \text{thermal diffusivity}$$

$$\text{cooling time} = \frac{-t^2}{\pi^2 a} \ln \left[ \frac{4}{\pi} \frac{T\text{melt} - T\text{mold}}{T\text{demold temp} - T\text{mold}} \right]$$

The thermal diffusivity is proportional to specific heat, thermal conductivity, density. The cooling rate is determined by the thermal diffusivity of the material. The higher the thermal diffusivity, the faster the cooling rate.

The front mold half or curve 10 further defines a tab 20 integral with the flange 18 which projects from one side of the flange. The tab 20 extends to the injection hot tip (by the notation GATE) which supplies molten thermoplastic to the mold. The gate diameter is typically in the range of 0.4 to 1.4 mm, preferably in the range of 0.6 to 1.2 mm, and most preferably in the range of 0.8 to 1.0 mm, and is selected to result in minimal shear stress in the molten thermoplastic which is injected. Control of the gate size also helps to control the flow rate of the molten thermoplastic, which (in conjunction with temperature and rate of heat removal) helps control the final dimensional characteristics of the molded part and optimizes the processing of the molded part. The optimum size of the gate is calculated by considering the material flow index of the thermoplastic polymer, the wall thickness, part volume, an also considering the hot runner tip temperature and mold temperature.

The injection point feeds into a planarizing zone which fulfills several important functions. The planarizing zone is generally thin and flat, preferably having the same thickness as the rest of the mold cavity. The planarizing zone preferably is generally triangular, having an apex near which the injection gate point feeds molten thermoplastic into the planarizing zone. The planarizing zone diverges gradually in width from the apex region toward the rest of the mold cavity. Where the planarizing zone intersects the flange portion of the mold, the width diverges more, preferably uniformly from both sides of the zone. Thus, the planarizing zone is preferably symmetrical about the plane formed by the injection point and the axis of the concave surface of the molds.

One function of the planarizing zone is planarizing the flow of the injected molten thermoplastic into a smoothly steadily advancing flow of material filling the zone and feeding directly into the flange and concave-convex regions of the mold. Controlling the flow characteristics imparted by the dimensions of the planarizing zone, in conjunction with the feed pressure, flow rate, and temperature of the molten thermoplastic and the rate of heat withdrawal therefrom, enables obtaining the desired characteristics of the completed mold half.

The planarizing zone also serves to form the tab 20 which is integral with the rest of the completed mold half and is an essential part of that article.

The tab 20 defines therein an angled (e.g., 45°) web section 22, which is included in the design to break up the flow of molten thermoplastic in the molding process prior to the flow entering the optical quality portion of the mold. A step is created in the tab to break the polymer flow and smooth out the advancing melt flow, thus reducing and preferably eliminating jetting of the flowing molten thermoplastic which could lead to sink marks, dimensional inconsistency, and unacceptable irregularities in the surface of the molded mold half. The step forces a reversal of the melt momentum back to the start. This in turn causes the polymer to form an advancing front which fills the cavity more smoothly. This also moves the air in the mold cavity towards the vent lines and results in an optical part free of weakness lines, thus producing a dimensionally superior part.

Vent lines are provided in the mold to assist in removing air therefrom and preventing possible melt flow stagnation. In a preferred embodiment, the vent lines are provided outside and spaced around the annular flange at locations spaced furthest from the mold gate. If this concept is not properly engineered, the flange opposite the hot runner side can have weld lines at the converging melt flows. The hot runner gate is positioned, and the tab is designed, to allow for even and uniform polymer flow so that the advancing polymer flow does not produce weld lines, which are a source of surface imperfection, mechanical stress, and a point of weakness.

Moreover, the front mold half 10 also defines a small circular projection 24 which is positioned across from the injection hot tip which supplies molten thermoplastic to the mold. The projection 24 functions as a trap to immobilize a small slug of cold thermoplastic which may form at the injection hot tip between molding cycles. The plastic well immobilizes a small slug of cold thermoplastic which may form at the injection hot tip between molding operations, and essentially captures the initial melt flow from the hot runner gate tip. Thus, the well 24 is positioned adjacent to the point at which the molten thermoplastic is injected into the mold. Preferably, the well 24 is directly across from that point, the better to catch the first injected thermoplastic. It is imperative that during initial injection this mass of cold polymer be trapped in the cold well and not enter the melt stream. This could cause part dimensional variations due to melt temperature and possible shrinkage variation, jetting, and freezing of the melt flow. Variations of the tab length in conjunction with the size of the cold well can vary, for example, with a longer tab length and smaller cold slug well.

The location of the hot runner gate on the tab with respect to the optical surface ensures minimal heat distortion and part dimensional stability. The location of the gate and tab geometry is designed to prevent polymer jetting (which causes marks and dimensional variations). When the melt flow hits the cold slug plane and then the step 22, impinging occurs which smooths out the melt flow. The abrupt transition at the step prevents transportation of a cold surface layer into the rest of the mold. The radius at the transition step and divergence angle of the tab, in conjunction with the flow rate and the injection pressure, results in a laminar flow of the melt flow into the optical cavity and prevents the jetting phenomena. The cold slug well opposite the gate captures the first part of the polymer stream, which allows a more homogeneous melt front which relates to optical quality.

The design of the flange 18 helps demolding and part handling, and also protects the optical surfaces and the well defined edge as described earlier. The geometry of the tab 20 serves an additional function in straightening and orientating the assembled front curve/back curve prior to demolding. When a front mold half or curve is assembled with a back mold half or curve, a gap is formed between the two projecting tabs which is important for demolding. The gap between the tabs typically has a range of 0.5 to 3.0 mm, preferably has a range of 1.0 to 2.5 mm, and most preferably has a range of 2.0 to 2.25 mm and is needed to initiate the demolding operation.

A finite element analysis enabled a better design of the part geometry from the following points:

hot runner gate location;

filling time for cycle time reduction;

weld lines, air traps, flow direction;

ease of filling the mold;

shear rate, shear stress and temperature profiles;

cooling requirements.

This type of analysis based on fluid dynamics (rheology) and thermodynamics is used to give approximations for momentum and energy of the melt flow.

The flow length distance of the polymer has been significantly reduced relative to prior designs, which greatly enhances the ability to optimize the optical attributes. There is lesser probability of freezing the flow passageway as mold temperatures are reduced further to improve cycle time. One unexpectedly advantageous aspect of the present invention is that operations are carried out at higher thermoplastic temperatures while still realizing successful production within shortened cycle times.

FIGS. 3 and 4 illustrate respectively top elevational and side views of one embodiment of a back mold half 30. The back mold half 30 is designed with all of the same design considerations mentioned hereinabove with respect to the front mold half 10.

FIG. 5 illustrates a mold assembly in which a back mold half 30 is positioned on top of a front mold half 10, and illustrates the mold cavity 42 formed therebetween, as well as the defined gap between the opposed flanges of the back and front mold halves.

The back mold half 30 is also preferably formed of polystyrene, but could be any suitable thermoplastic such as mentioned hereinabove in the family of thermoplastics. The back mold half 30 defines a central curved section with an optical quality convex surface 32, a generally parallel concave surface 34 spaced from the convex surface 32, and an annular essentially uniplanar flange 36 formed extending radially outwardly from the surfaces 32 and 34. The convex surface 32 has the dimensions of the rear curve (which rests upon the cornea of the eye) of a contact lens to be produced by the back mold half, and is sufficiently smooth such that the surface of a contact lens formed by polymerization of a polymerizable composition in contact with the surface is of optically acceptable quality. The back mold half is designed with a thickness to transmit heat therethrough rapidly (typically in the range of 0.4 mm to 1.2 mm, preferably in the range of 0.5 to 0.8 mm, and most preferably in the range of 0.6 to 0.8 mm, and in one embodiment was selected to be 0.6 mm) and rigidity to withstand prying forces applied to separate the mold half from the mold assembly during demolding.

The back curve is designed with a back curve sag typically in the range of 1.5 to 6.5 mm, preferably in the range of 2.5 to 6.0 mm, and most preferably in the range of 5.1 to 5.8 mm (see FIG. 4 for the predetermined sag, dimension "Y"). The back curve sag and above specified ranges of thickness serve two purposes:

1. The back curve sag results in a gap typically in the range of 0.5 to 3.0 mm, preferably in the range of 1.0 to 2.5 mm, and most preferably in the range of 2.0 to 2.25 mm between the assembled back curve and front curve, which assists in mechanically removing the back curve from the front curve matrix after polymerization.

2. With a part thickness in the above specified ranges, the back curve was designed to reduce the occurrence of weld lines on the distal side of the flange (where two melt flows converge) which could detrimentally cause a fracture line on the back curve.

The back mold half or curve 30 also defines a tab 36 integral with the flange which projects from one side of the flange. The tab 36 extends to the injection hot tip which supplies molten thermoplastic to the mold, and also defines therein an angled (e.g., 45°) section 38 for the same reasons as in the front mold half 10. The back mold half 30 also defines a small circular projection 40 for the same reasons as in the front mold half 10.

The tab design length "X," FIG. 3, is important for the following reasons:

minimizes heat distortion to the optical side of the part;

the location and the distance are important;

consistency of roundness for optical power radius;

cycle time reduction;

length X can vary typically in a range of 10 to 30 mm, preferably in a range of 12 to 26 mm, and most preferably in a range of 16 to 24 mm.

To achieve a minimized molding time, the thickness of each mold half should be reduced as much as possible, while considering other design constraints such as the desired rigidity of each mold half. In general, the back mold half 30 should be more flexible than the front mold half 10 and so is slightly thinner. The thickness of the front mold half 10 is thinner than a comparable prior art mold half which generally had a thickness on the order of 1.4 mm.

In one designed embodiment, the back curve and front curve thicknesses were chosen to be in the specified ranges, specifically 0.6 mm and 0.8 mm, respectively, to ensure adequate polymer flow without freezing the advancing melt flow, maintain the proper strength and rigidity during demolding, minimize weld line formations, and optimize cycle time reduction.

The inner concave surface of the front mold half defines the outer surface of the contact lens, while the outer convex surface of the back mold half defines the inner surface of the contact lens which rests upon the eye. Accordingly the shape of the inner concave surface of the female mold half and the shape of the outer convex surface of the male mold half must have acceptable optical quality surfaces. The outer convex surface of the front mold half and the inner concave surface of the back mold half need not have optical quality surfaces, and in fact the side of each mold half having one of those surfaces is used by robotic handling equipment to handle the mold halves. The present invention takes advantage of this latter feature to provide molding and very rapid cooling of the critical optical quality surfaces of the contact lens molds, i.e., the inner concave surface of the front mold half and the outer convex surface of the back mold half.

Pursuant to the present invention, the master molds to mold the thermoplastic mold halves or curves are designed to achieve excellent heat transfer characteristics to quickly reduce the temperature of the molds from approximately 200°–300° C. at the injection tip (by the arrow designated GATE) at which the molten thermoplastic enters the mold to approximately 80°–90° C., when the mold halves can be opened in approximately three to six seconds, as compared with a typical 24 second mold cycle for the prior art.

Figure 6:
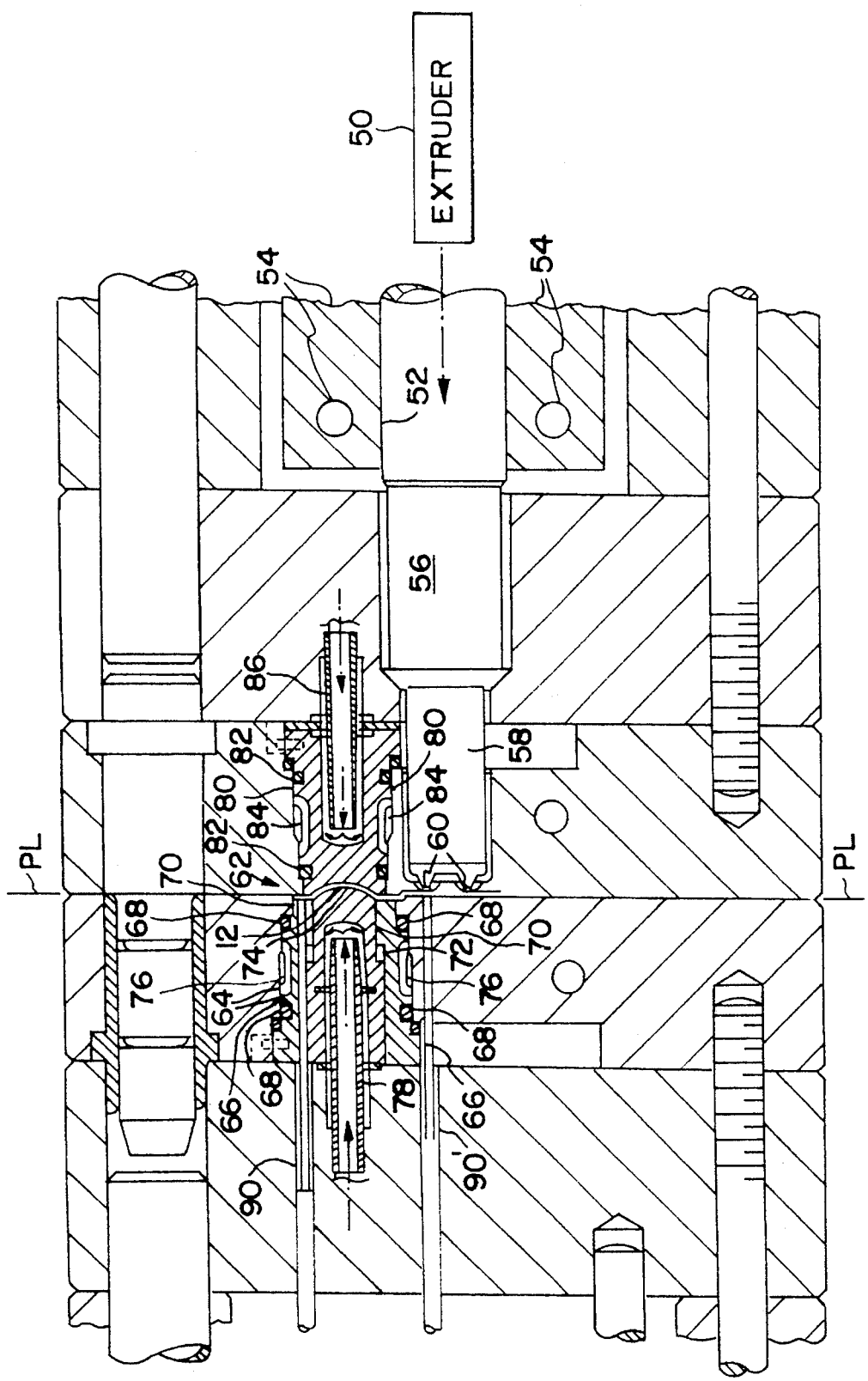
FIG. 6 is a sectional view through a hot runner mold constructed pursuant to the teachings of the present invention, in which one of eight similar mold cavities for a front mold half is shown in section to illustrate the construction of each mold cavity.

Pursuant to the present invention, and referring to FIG. 6, molten thermoplastic material is initially extruded by a screw extruder 50. When polystyrene is used as the molten thermoplastic material, the discharge end of the screw extruder 50 has a temperature of approximately 200°–300° C. The molten thermoplastic material is then introduced into a heated manifold 52 having heaters 54 therein to raise the temperature of the molten thermoplastic material further, in the case of polystyrene to approximately 270°–280° C. The molten thermoplastic material then flows into a hot runner system 56 which feeds two multi-tip extruders 58 (only one of which is shown in FIG. 6), each of which has four hot tip extrusion apertures 60, two of which are illustrated in FIG. 6; at this point molten polystyrene is approximately 200°–300° C. One or more temperature sensors, such as thermocouples, may be strategically positioned in the molding arrangement to monitor the temperature of the molten thermoplastic, to control heaters or other parameters for control of the molding operation. Each hot tip extrusion aperture feeds a single mold cavity 62, one of which is illustrated in FIG. 6. One preferred molding arrangement includes eight mold cavities of the type illustrated in FIG. 6 which are positioned at the end of, and spaced around, the multi-tip extruders 58.

One of the features of the present invention is that the optical quality surface of the mold half is positioned away from the heat source of the extrusion equipment, while the second non-optical quality surface of the mold half is positioned towards the heat source of the extrusive equipment. The arrangement illustrated in FIG. 6 is for molding the front half mold 10 of the mold halves. The concave surface 12 of the front mold half defines the optical quality surface, and accordingly the concave surface 12 of the front mold half is positioned on the left side in the molding arrangement of FIG. 6.

The molding cavity 62 illustrated in FIG. 6 includes a two piece molding insert 64 on the left side, having an outer bushing 66 which is sealed relative to the molding machine by O-rings 68. A power insert 70 is positioned in the outer bushing 66 and is sealed relative thereto by an O-ring 72. The power insert 70 is so named because its right end convex surface 74 defines the optical power of the optical quality surface of the front mold half and also of the hydrogel soft contact lens which is subsequently molded in the polystyrene mold half. The two piece insert design on the left side of FIG. 6 allows the optical quality surface 74 of the power insert 70 to be machined on the relatively simpler construction of just the power insert, which simplifies the engineering and construction of the two piece insert 64. Moreover, different optical power (diopter) lenses can be produced by merely changing the power insert to substitute a different power insert having a different curvature convex end surface.

The outer surface of the bushing 66 defines an outer circumferential cooling passageway 76 therearound, through which a coolant is continuously circulated. The circumferential cooling passageway could also be defined in the mold block which retains the bushing 66, rather than in the bushing 66, to reduce manufacturing costs.

A bubbler 78 is positioned within the power insert, through which coolant is continuously circulated and ejected against the inner internal surfaces of the power insert, and then flows outwardly in a reverse direction through the annular passageway around the bubbler insert.

The right side of the mold cavity of FIG. 6 defines the non-optical quality surface of the front mold half, and accordingly, in view of its simpler and less critical construction, is designed as a single piece insert bushing 80 which is sealed relative to the molding arrangement by O-rings 82. The bushing 80 includes an outer circumferential cooling passageway 84 through which a coolant is continuously circulated, and also mounts therein a bubbler insert 86, through which coolant is continuously circulated and ejected against the internal end surfaces of the insert 80, and then flows outwardly in a reverse direction through the annular passageway around the bubbler insert.

The coolant can be a solution of water and anticorrosion inhibitors, such as a 50/50 mixture of water and ethylene glycol. The coolant is continuously circulated in a turbulent flow mode by a cooling system having high power pumps to provide maximum cooling. Turbulent flow mode cooling is preferred to laminar flow cooling as it is approximately three times more effective than laminar flow cooling. Two separate coolant flow circuits are provided. The first coolant circuit has a high power pump with an 80 psi pressure head which circulates coolant at approximately 45°–85° C. at a flow rate from the pump of approximately 30±5 gallons per minute to cause the coolant to circulate continuously in a turbulent flow mode through the circumferential cooling passages of each mold cavity. The eight separate mold cavities as described hereinabove are typically connected in series in the first coolant circuit, with coolant, flowing in series from one mold cavity to an adjacent mold cavity, etc. The second coolant circuit also has a high power pump with an 80 psi pressure head which circulates coolant at approximately 45°–85° C. at a flow rate from the pump of approximately 30±5 gallons per minute to cause the coolant to circulate continuously in a turbulent flow mode through the bubbler inserts in each mold cavity. A differential temperature range can be set to improve part quality.

The continuous flow of coolant through the outer circumferential cooling passages 76, 84 and the inner bubblers 78, 86 results in rapid cooling of the molded curves or mold halves to approximately 80°–90° C, at which temperature residual stresses are substantially locked into the molded component, particularly at the optical quality surface side, and the master mold halves can be opened along parting line (PL) to remove the molded curves or mold halves without damaging the optical quality surface of the mold halves. After opening of the master mold, a plurality of ejector pins 90, four positioned circumferentially around the mold cavity and a fifth 90' positioned at the mold tab, are displaced to the right as illustrated in FIG. 5, to eject the mold half from each cavity.

The systematic arrangement of the five ejector pins serves a useful purpose. The ejector pins are positioned to ensure minimal stress buildup in the part during part ejection; this is very important to ensure part dimensional consistency. One ejector pin is located at the distal end of the part (opposite side of the hot runner gate) to ensure adequate mold gas venting during the final filling phase, and the reduction of weld lines. The arrangement ensures smooth and reliable ejection after the part has reasonably cooled down and to minimize stress formation. This again ensures dimensional consistency. This concept lends well to cycle efficiency and deters parts from sticking to the wrong side of the mold.

FIG. 6 illustrates molding of the front mold halves 10. The back mold halves 30 are molded in a similar arrangement as illustrated in FIG. 7, with similar mold inserts, except that the power insert 94 now has a concave optical quality end surface as the back mold halves 30 have an optical quality surface on their convex surface rather than on their concave surface.

Figure 7:
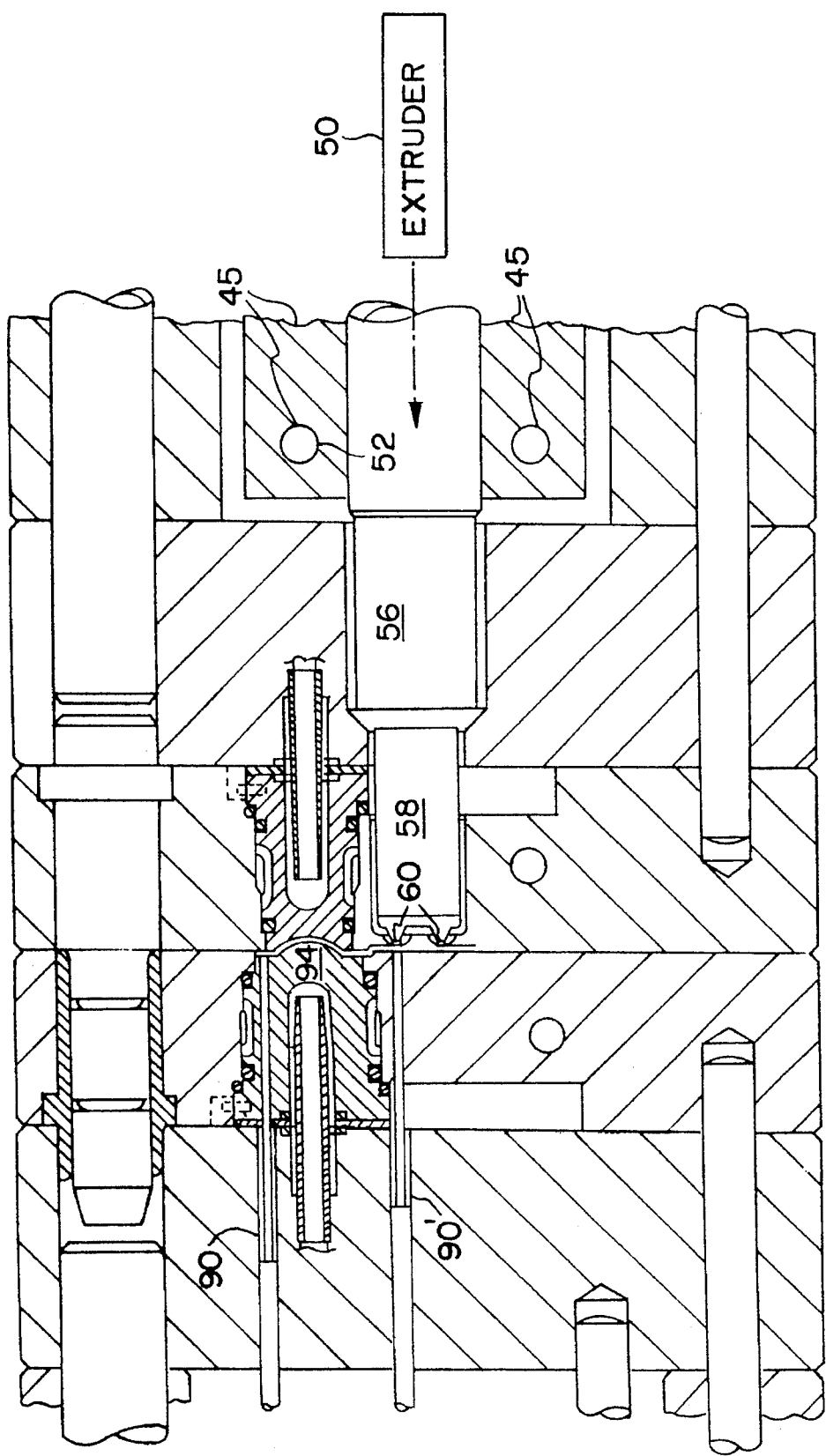
FIG. 7 is a sectional view through a hot runner mold similar to that of FIG. 6, but for a back mold half.

FIG. 7 is a sectional view through a hot runner mold similar to that of FIG. 6, but for a back mold half 30. The convex surface of the back mold half defines the optical quality surface, and accordingly the convex surface of the back mold half is positioned on the left side in the molding arrangement of FIG. 7.

While several embodiments and variations of the present invention for a molding arrangement with a mold insert design to achieve short mold cycle time are described in detail herein, it should be apparent that the disclosure and teachings of the present invention will suggest many alternative designs to those skilled in the art.

What is claimed is:

1. A molding arrangement for molding a mold half which is used for subsequent molding of a soft contact lens, with the mold half defining a convex curved surface and a concave curved surface spaced from the convex surface, with one of the convex and concave surfaces defining an optical quality curved surface for the soft contact lens, comprising a heated mold for introducing a molten mold material through a hot runner system to at least one mold cavity, said at least one mold cavity defining an optical quality curved surface for the mold half and a second curved surface for the mold half, with the optical quality surface of the mold cavity being positioned further away from the heated hot runner system than the second surface of the mold cavity, and a cooling system for cooling the at least one mold cavity, whereby the positioning of the optical quality curved surface further away from the heated hot runner system allows faster cooling of the optical quality surface of the mold cavity than the second surface of the mold cavity to allow quicker setting and locking of minimal temperature residual stresses on the optical quality side of the mold half and a faster molding and cycling time for the molding arrangement, wherein the mold half is a back mold half wherein the convex surface of the back mold half defines the optical quality surface, and the convex surface of the back mold half is positioned further away from the heated hot runner system than the second surface of the mold cavity.

2. A molding arrangement as claimed in claim 1, wherein the material being molded into the mold half is polystyrene, and the molding machine includes means for introducing molten polystyrene into the at least one mold cavity.

3. A molding arrangement for molding a mold half which is used for subsequent molding of a soft contact lens, with the mold half defining a convex curved surface and a concave curved surface spaced from the convex surface, with one of the convex and concave surfaces defining an optical quality curved surface for the soft contact lens, comprising a heated mold for introducing a molten mold material through a hot runner system to at least one mold cavity, said at least one mold cavity defining an optical quality curved surface for the mold half and a second curved surface for the mold half, with the optical quality surface of the mold cavity being positioned further away from the heated hot runner system than the second surface of the mold cavity, and a cooling system for cooling the at least one mold cavity, whereby the positioning of the optical quality curved surface further away from the heated hot runner system allows faster cooling of the optical quality surface of the mold cavity than the second surface of the mold cavity to allow quicker setting and locking of minimal temperature residual stresses on the optical quality side of the mold half and a faster molding and cycling time for the molding arrangement, wherein said at least one mold cavity comprises a first insert on the optical quality side of the mold cavity and a second insert on the second side of the mold cavity, and wherein said first insert on the optical quality side of the mold includes a bushing, and a power insert positioned within the bushing, with the power insert having an end surface which defines the optical quality surface of the mold half.

4. A molding arrangement as claimed in claim 3, wherein each of said first and second inserts has a circumferential cooling passageway therearound or in proximity thereto, through which coolant is circulated by said cooling system.

5. A molding arrangement as claimed in claim 4, wherein each of said first and second inserts includes a bubbler positioned internally therein, through which coolant is circulated by said cooling system against inner surfaces of the insert.

6. A molding arrangement as claimed in claim 5, wherein said cooling system includes means for circulating coolant in a turbulent flow mode through the circumferential cooling passageways, and also through the bubblers.

7. A molding arrangement as claimed in claim 1, wherein the molding arrangement includes a plurality of mold cavities positioned at one end of, and spaced around, the hot runner system.

8. A molding arrangement as claimed in claim 1, wherein the molding arrangement defines a mold half which further includes an annular flange extending around the concave and spaced convex curved surfaces.

9. A molding arrangement for molding a mold half which is used for subsequent molding of a soft contact lens, with the mold half defining a convex curved surface and a concave curved surface spaced from the convex surface, with one of the convex and concave surfaces defining an optical quality curved surface for the soft contact lens, comprising a heated mold for introducing a molten mold material through a hot runner system to at least one mold cavity, said at least one mold cavity defining an optical quality curved surface for the mold half and a second curved surface for the mold half, with the optical quality surface of the mold cavity being positioned further away from the heated hot runner system than the second surface of the mold cavity, and a cooling system for cooling the at least one mold cavity, whereby the positioning of the optical quality curved surface further away from the heated hot runner system allows faster cooling of the optical quality surface of the mold cavity than the second surface of the mold cavity to allow quicker setting and locking of minimal temperature residual stresses on the optical quality side of the mold half and a faster molding and cycling time for the molding arrangement, wherein the molding arrangement defines a mold half which further includes an annular flange extending around the concave and spaced convex curved surfaces, wherein the molding arrangement also defines a substantially triangular shaped tab projecting from the annular flange at the base of the triangular tab to a rounded apex, and wherein the molding arrangement includes a mold gate centrally positioned at said rounded apex.

10. A molding arrangement as claimed in claim 9, wherein the molding arrangement defines a mold half having a substantially uniform thickness across the concave and spaced convex curved surfaces, the annular flange extending therearound, and the substantially triangular tab projecting from the annular flange, which results in uniform shrinkage of the mold half during cooling and improved dimensional control of the mold half.

11. A molding arrangement as claimed in claim 10, wherein the mold half is a back mold half and said substantially uniform thickness is in the range from 0.4 to 1.2 mm.

12. A molding arrangement as claimed in claim 10, wherein said substantially uniform thickness is 0.6 mm.

13. A molding arrangement as claimed in claim 10, wherein the mold half is a front mold half and said substantially uniform thickness is in the range from 0.4 to 1.2 mm.

14. A molding arrangement as claimed in claim 13, wherein said substantially uniform thickness is 0.8 mm.

15. A molding arrangement as claimed in claim 9, wherein said mold gate is positioned a distance X from the symmetric centers of said concave and spaced convex curved surfaces, which distance X is in the range from 13 to 24 mm, to minimize heat distortion and provide improved dimensional control of the optical quality curved surface of the mold half.

16. A molding arrangement as claimed in claim 15, wherein said distance X is substantially 18 mm.

17. A molding arrangement as claimed in claim 9, wherein said tab defines an angled step therein which causes a reversal in and smooths the flow of molten thermoplastic prior to the flow of molten thermoplastic entering the concave and spaced convex curved surfaces of the molding arrangement.

18. A molding arrangement as claimed in claim 17, wherein said angled step is defined a fixed radial distance from the symmetric centers of said concave and spaced convex curved surfaces.

19. A molding arrangement as claimed in claim 17, wherein said angled step is defined at a substantially 45° angle.

20. A molding arrangement as claimed in claim 9, wherein the sides of the triangular tab converging at said apex defines an apex angle in the range of 15° to 35°.

21. A molding arrangement as claimed in claim 20, wherein said apex angle is substantially 27°.

22. A molding arrangement as claimed in claim 9, wherein said mold gate defines a gate size diameter in the range of 0.4 to 1.4 mm.

23. A molding arrangement as claimed in claim 8, wherein a plurality of vent lines are positioned outside and spaced around the annular flange at locations on the annular flange spaced furthest from said hot runner system.

24. A molding arrangement as claimed in claim 9, wherein the molding arrangement defines a cold slug well positioned across the tab from the mold gate to capture an initial flow of molten thermoplastic, and any partially solidified slug of molten thermoplastic therein, to prevent the partially solidified thermoplastic from flowing further into the molding arrangement.

25. A molding arrangement as claimed in claim 9, wherein the molding arrangement includes a plurality of ejector pins positioned around said annular flange and an injector pin positioned centrally at said rounded apex, to minimize stresses on the mold half during ejection thereof from the molding arrangement.

26. A molding arrangement for molding a mold half which is used for subsequent molding of a soft contact lens, with the mold half defining a convex curved surface and a concave curved surface spaced from the convex surface, with one of the convex and concave surfaces defining an optical quality curved surface for the soft contact lens, comprising a heated mold for introducing a molten mold material through a hot runner system to at least one mold cavity, said at least one mold cavity defining an optical quality curved surface for the mold half and a second curved surface for the mold half, wherein said at least one mold cavity comprises a first insert on the optical quality side of the mold cavity and a second insert on the second side of the mold cavity, and each of said first and second inserts has a circumferential cooling passageway therearound, through which coolant is circulated by a cooling system to provide for faster cooling of the mold cavity to allow quicker setting and locking of minimal temperature residual stresses in the mold half and a faster molding and cycling time for the molding arrangement, wherein said first insert on the optical quality side of the mold includes a bushing, and a power insert positioned within the bushing, with the power insert having an end surface which defines the optical quality surface of the mold half.

27. A molding arrangement as claimed in claim 26, wherein the material being molded into the mold half is polystyrene, and the molding machine includes means for introducing molten polystyrene into the at least one mold cavity.

28. A molding arrangement as claimed in claim 26, wherein each of said first and second inserts includes a bubbler positioned internally therein, through which coolant is circulated by said cooling system against inner surfaces of the insert.

29. A molding arrangement as claimed in claim 28, wherein said cooling system includes means for circulating coolant in a turbulent flow mode through the circumferential cooling passageways, and also through the bubblers.

30. A molding arrangement as claimed in claim 26, wherein the molding arrangement includes a plurality of mold cavities positioned at one end of, and spaced around, the hot runner system.

31. A method of molding a mold half which is used for subsequent molding of a soft contact lens, with the mold half defining a convex curved surface and a concave curved surface spaced from the convex surface, with one of the convex and concave surfaces defining an optical quality curved surface for the soft contact lens, comprising introducing a molten mold material through a hot runner system to at least one mold cavity, defining in the at least one mold cavity an optical quality curved surface for the mold half and a second curved surface for the mold half, positioning the optical quality surface of the mold cavity further away from the heated hot runner system than the second surface of the mold cavity, and cooling the at least one mold cavity, whereby the positioning of the optical quality curved surface further away from the heated hot runner system allows faster cooling of the optical quality surface of the mold cavity than the second surface of the mold cavity to allow quicker setting and locking of temperature residual stresses on the optical quality side of the mold half and a faster molding and cycling time for the molding arrangement.

32. A method of molding as claimed in claim 31, wherein the mold half is a female mold half wherein the concave surface of the female mold half defines the optical quality surface, and including the step of positioning the concave surface of the female mold half further away from the heated hot runner system than the second surface of the mold cavity.

33. A method of molding as claimed in claim 31, wherein the mold half is a male mold half wherein the convex surface of the male mold half defines the optical quality surface, and including the step of positioning the convex surface of the male mold half further away from the heated hot runner system than the second surface of the mold cavity.

34. A method of molding as claimed in claim 31, including introducing molten polystyrene material into the at least one mold cavity.

35. A method of molding as claimed in claim 31, including the step of forming said at least one mold cavity by a first insert on the optical quality side of the mold cavity and a second insert on the second side of the mold cavity.

36. A method of molding as claimed in claim 35, wherein said first insert on the optical quality side of the mold includes a bushing, placing a power insert within the bushing, and defining the optical quality surface of the mold half on an end surface of the power insert.

37. A method of molding as claimed in claim 35, including defining a circumferential cooling passageway around or in proximity to each of said first and second inserts, and circulating coolant through the circumferential cooling passageways.

38. A method of molding as claimed in claim 37, including circulating coolant in a turbulent flow mode through the circumferential cooling passageways.

39. A method of molding as claimed in claim 35, including positioning a bubbler internally within each of said first and second inserts, and circulating coolant through the bubblers against inner surfaces of the insert.

40. A method of molding as claimed in claim 39, including circulating coolant in a turbulent flow condition through the bubblers.

41. A method of molding a mold half which is used for subsequent molding of a soft contact lens, with the mold half defining a convex curved surface and a concave curved surface spaced from the convex surface, with one of the convex and concave surfaces defining an optical quality curved surface for the soft contact lens, comprising introducing a molten mold material through a hot runner system to at least one mold cavity, defining in the at least one mold cavity an optical quality curved surface for the mold half and a second curved surface for the mold half by positioning a first insert on the optical quality side of the mold cavity and a second insert on the second side of the mold cavity, defining a circumferential cooling passageway around or in proximity to each of said first and second inserts, and circulating a coolant through each circumferential cooling passageway to provide for faster cooling of the mold cavity to allow quicker setting and locking of minimal temperature residual stresses in the mold half and a faster molding and cycling time.

42. A method of molding as claimed in claim 41, wherein the material being molded into the mold half is polystyrene, and including introducing molten polystyrene into the at least one mold cavity.

43. A method of molding as claimed in claim 41, wherein said first insert on the optical quality side of the mold includes a bushing, defining said circumferential cooling passageway around or in proximity to said bushing, positioning a power insert within the bushing, and defining the optical quality surface of the mold half by an end surface of the power insert.

44. A method of molding as claimed in claim 41, including positioning a bubbler internally within each of said first and second inserts, and circulating a coolant against inner surfaces of the inserts.

45. A method of molding as claimed in claim 44, including circulating coolant in a turbulent flow mode through the circumferential cooling passageways and also through the bubblers.

46. A method of molding as claimed in claim 41, including positioning a plurality of mold cavities at one end of, and spaced around, the hot runner system.

\* \* \* \* \*